United States Patent
Lee et al.

(10) Patent No.: US 10,615,381 B2
(45) Date of Patent: Apr. 7, 2020

(54) CAP ASSEMBLY FOR SECONDARY BATTERY

(71) Applicant: LG Chem, Ltd., Seoul (KR)

(72) Inventors: Byoung Kook Lee, Daejeon (KR); Hang Soo Shin, Daejeon (KR); Do Gyun Kim, Daejeon (KR); Je Jun Lee, Daejeon (KR); Jun Tak Kim, Daejeon (KR); Byoung Gu Lee, Daejeon (KR); Sang Suk Jung, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/559,591

(22) PCT Filed: Jun. 27, 2016

(86) PCT No.: PCT/KR2016/006852
§ 371 (c)(1),
(2) Date: Sep. 19, 2017

(87) PCT Pub. No.: WO2017/010700
PCT Pub. Date: Jan. 19, 2017

(65) Prior Publication Data
US 2018/0062122 A1 Mar. 1, 2018

(30) Foreign Application Priority Data

Jul. 15, 2015 (KR) .................. 10-2015-0100549

(51) Int. Cl.
*H01M 2/04* (2006.01)
*H01M 2/12* (2006.01)
(Continued)

(52) U.S. Cl.
CPC .......... *H01M 2/0404* (2013.01); *H01M 2/04* (2013.01); *H01M 2/0413* (2013.01); *H01M 2/12* (2013.01);
(Continued)

(58) Field of Classification Search
CPC .. H01M 2/0404; H01M 2/1241; H01M 2/348; H01M 2200/106; H01M 2200/20; H01M 2220/30
See application file for complete search history.

(56) References Cited

U.S. PATENT DOCUMENTS 4,943,497 A * 7/1990 Oishi ............... H01M 2/34
429/53
5,609,972 A * 3/1997 Kaschmitter ....... H01M 2/1241
429/56

(Continued)

FOREIGN PATENT DOCUMENTS

CN 1255885 C 6/2000
CN 1297260 A 5/2001
(Continued)

OTHER PUBLICATIONS

Extended European Search Report for Application No. EP16824617.1 dated Jan. 24, 2018.
(Continued)

*Primary Examiner* — Osei K Amponsah
(74) *Attorney, Agent, or Firm* — Lerner, David, Littenberg, Krumholz & Mentlik, LLP

(57) ABSTRACT

The present invention relates to a cap assembly for a secondary battery mounted on an opening of a can. The cap assembly comprises: a top cap; a safety element disposed on a lower portion of the top cap; a safety vent disposed on a lower portion of the safety element; and a gasket surrounding edges of the top cap, the safety element, and the safety vent and mounted on the opening of the can, wherein an impact absorption part absorbing an impact from the gasket is disposed between an inner wall of the gasket and an outer circumferential surface of the safety vent.

19 Claims, 9 Drawing Sheets

(51) Int. Cl.
*H01M 2/34* (2006.01)
*H01M 10/04* (2006.01)

(52) U.S. Cl.
CPC ......... *H01M 2/1241* (2013.01); *H01M 2/348* (2013.01); *H01M 10/04* (2013.01); *H01M 2200/106* (2013.01); *H01M 2200/20* (2013.01); *H01M 2220/30* (2013.01)

(56) References Cited

U.S. PATENT DOCUMENTS

| | | | |
|---|---|---|---|
| 5,654,114 A * | 8/1997 | Kubota | H01M 4/485 429/231.3 |
| 6,537,693 B1 | 3/2003 | Suzuki et al. | |
| 6,777,128 B2 | 8/2004 | Kim | |
| 2002/0122974 A1 | 9/2002 | Kim | |
| 2005/0118495 A1 | 6/2005 | Kim | |
| 2008/0254343 A1 * | 10/2008 | Kaplin | H01M 2/1223 429/53 |
| 2013/0216870 A1 | 8/2013 | Kim et al. | |
| 2018/0062122 A1 | 3/2018 | Lee et al. | |

FOREIGN PATENT DOCUMENTS

| | | |
|---|---|---|
| CN | 102340019 A | 2/2012 |
| EP | 3264490 A1 | 1/2018 |
| KR | 20020071179 A | 9/2002 |
| KR | 20050052221 A | 6/2005 |
| KR | 100709871 B1 | 4/2007 |
| KR | 100958649 B1 | 5/2010 |
| KR | 20120063264 A | 6/2012 |
| KR | 20130019706 A | 2/2013 |
| KR | 20130025198 A | 3/2013 |
| WO | 2017010700 A1 | 1/2017 |

OTHER PUBLICATIONS

Search report from International Application No. PCT/KR2016/006852, dated Oct. 6, 2016.

Chinese Search Report for Application No. CN 201680021094.8 dated Dec. 31, 2019, 3 pages.

* cited by examiner

CAP ASSEMBLY FOR SECONDARY BATTERY

CROSS-REFERENCE TO RELATED APPLICATION

The present application is a national phase entry under 35 U.S.C. § 371 of International Application No. PCT/KR2016/006852 filed Jun. 27, 2016, which claims priority from Korean Patent Application No. 10-2015-0100549, filed on Jul. 15, 2015, the disclosures of which are hereby incorporated by reference.

TECHNICAL FIELD

The present invention relates to a cap assembly, and more particularly, a cap assembly that prevents an impact from being transferred from a gasket to a safety vent to prevent the safety vent from being ruptured.

BACKGROUND ART

In general, secondary batteries refer to chargeable and dischargeable batteries, unlike primary batteries that are not chargeable. Such a secondary battery is being widely used in the high-tech electronic fields such as mobile phones, notebook computers, and camcorders.

DISCLOSURE OF THE INVENTION

Technical Problem

The secondary battery according to the related art comprises an electrode assembly, a can accommodating the electrode assembly, and a cap assembly mounted on an opening of the can. The cap assembly comprises a top cap disposed at the uppermost portion, a safety element disposed on a lower portion of the top cap, a safety vent disposed on a lower portion of the safety element, and a gasket surrounding edges of the top cap, the safety element, and the safety vent and mounted on the opening of the can.

However, in the secondary battery according to the related art, the gasket extends in a diameter direction while being pressed when an impact is applied to the cap assembly. Here, while the extending gasket pressurizes the safety vent, the safety vent may be ruptured.

The present invention has been made to solve the above-mentioned problem, and an object of the prevent invention is to provide a cap assembly in which an impact absorption part is disposed between a gasket and a safety vent to prevent an impact from being transferred from the gasket to the safety vent, thereby preventing the safety vent from being ruptured.

Technical Solution

To achieve the abovementioned object, the present invention provides a cap assembly for a secondary battery, which is mounted on an opening of a can, the cap assembly comprising: a top cap; a safety element disposed on a lower portion of the top cap; a safety vent disposed on a lower portion of the safety element; and a gasket surrounding edges of the top cap, the safety element, and the safety vent and mounted on the opening of the can, wherein an impact absorption part absorbing an impact from the gasket is disposed between an inner wall of the gasket and an outer circumferential surface of the safety vent.

The impact absorption part may be an impact absorption space defined between the inner wall of the gasket and the outer circumferential surface of the safety vent.

The safety vent may have a diameter less than an inner diameter of the gasket so that the impact absorption space is defined.

A gap between the inner wall of the gasket and the outer circumferential surface of the safety vent may be about 0.01 mm to about 0.30 mm.

A support part aligning a reference position of the safety vent may be disposed in the impact absorption space.

At least three or more support parts may be disposed at the same interval on the inner wall of the gasket.

The support part may be integrated with the gasket.

The support plate may be provided as a vertical plate on the inner wall of the gasket.

The impact absorption part may be provided as an impact absorption member made of a material having elasticity.

The impact absorption member may be attached to the outer circumferential surface of the safety vent.

At least three or more impact absorption members may be attached at the same interval to the outer circumferential surface of the safety vent.

A coupling protrusion may be disposed on one contact surface of contact surfaces of the safety vent and the gasket, and a coupling groove, which is coupled to the coupling protrusion, may be defined in the other contact surface.

The coupling protrusion may be disposed on the contact surface of the gasket, and the coupling groove may be defined in the contact surface of the safety vent.

At least three or more coupling protrusions and at least three or more coupling grooves, which are coupled to each other, may be provided at the same interval along the contact surfaces of the safety vent and the gasket.

Advantageous Effects

The present invention has effects as follows.

First: the cap assembly in which the impact absorption part is disposed between the gasket and the safety vent may be provided to prevent the safety vent from being deformed and ruptured by the external impact, thereby improving the quality.

Second: the impact absorption part may be provided as the impact absorption space defined between the gasket and the safety vent to realize the impact absorption part without a separate constituent and an additional cost.

Third: the impact absorption space may be provided as the safety vent has a diameter less than that of the gasket to facilitate the manufacture of the secondary battery.

Fourth: the support part for matching the center of the safety vent may be provided in the impact absorption space to align the safety vent with the center of the gasket without separate adjustment.

Fifth: the impact absorption part may be provided as the impact absorption member that is made of the stretchable material disposed between the gasket and the safety vent to fix the center of the safety vent and prevent the safety vent from being deformed and ruptured through the impact absorption member.

MODE FOR CARRYING OUT THE INVENTION

Figure 1:
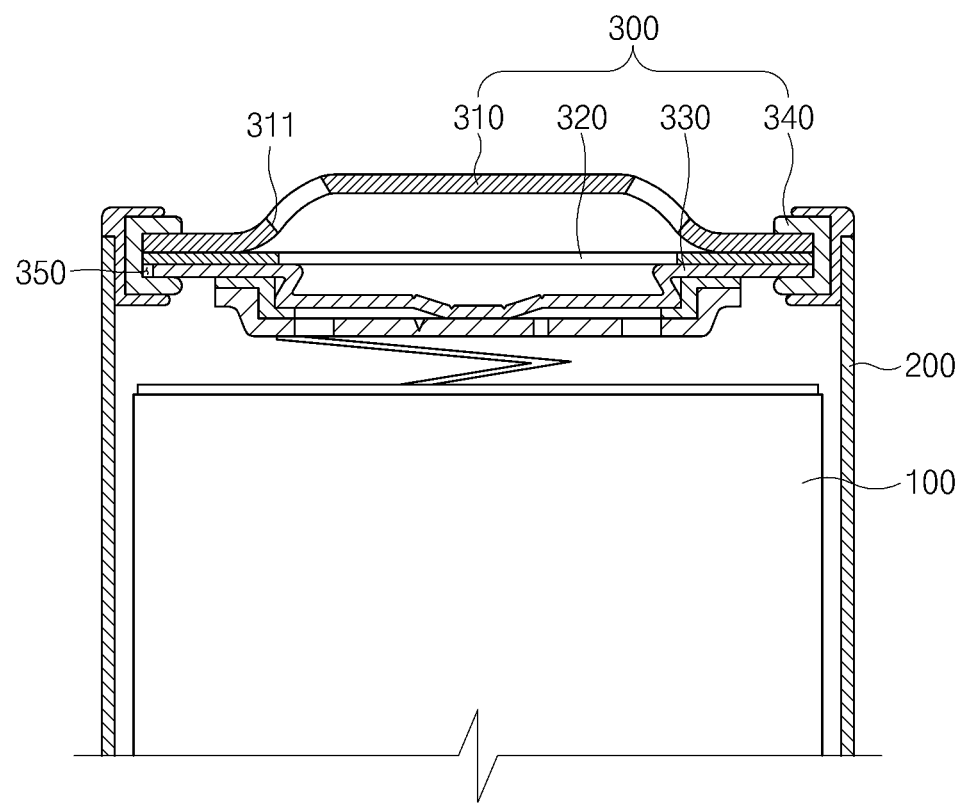
FIG. 1 is a cross-sectional view of a secondary battery according to the present invention.

Hereinafter, an embodiment of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

As illustrated in FIG. 1, a secondary battery according to the present invention comprises an electrode assembly 100, a can 200 accommodating the electrode assembly 100, and a cap assembly 300 mounted on an opening of the can 200.

The electrode assembly 100 may be manufactured by stacking a first electrode and a second electrode with a separate between the first and second electrodes and winding the stack in a roll shape. A first electrode tab connected to the cap assembly 300 is disposed on the first electrode, and a second electrode tab connected to the can 200 is disposed on the second electrode.

The can 200 has a cylindrical shape so that an opening is defined in a top surface thereof and also accommodates an electrolyte together with the electrode assembly 100.

The cap assembly 300 is mounted on the opening of the can 200 and comprises a top cap 310, a safety element 320 disposed on a lower portion of the top cap 310, a safety vent 330 disposed on a lower portion of the safety element 320, and a gasket 340 surrounding edges of the top cap 310, the safety element 320, and the safety vent 330 and mounted on the opening of the can 200.

The top cap 310 is disposed in a shape that protrudes upward from the uppermost portion of the cam assembly 300 to provide a positive electrode terminal.

Also, a gas hole 311 through which a gas is discharged may be defined in the top cap 310. Thus, when a gas is generated from the electrode assembly 100, the gas may be discharged to the outside of the cap assembly 300 through the gas hole 311.

The safety element 320 is interposed between the top cap 310 and the safety vent 330 to electrically connect the top cap 310 to the safety vent 330. In addition, when current flows in the battery due to overheating of the battery, the safety vent prevents the current from being transmitted to the top cap 310. For example, the safety vent 320 may be provided as a positive temperature coefficient (PTC) element.

The safety vent 330 is disposed to come into contact with the safety element 320 on the lower portion of the safety element 320. When an internal pressure of the secondary battery increases to a predetermined level or more, the safety vent 330 is configured to be ruptured.

That is, when a pressure within the can 200 increases to a predetermined level or more due to the generation of the gas from the electrode assembly 100, the safety vent 330 is ruptured to discharge the gas within the can 200 to the outside through the gas hole 311 of the top cap 310.

The gasket 340 is configured to seal a gap between the cap assembly 300 and the can 200. The gasket 340 surrounds the edges of the tap cap 310, the safety element 320, and the safety vent 330 and is mounted on the opening of the can 200 to seal the can 200.

In the secondary battery according to the present invention, when an external impact is applied to the cap assembly 300, the external impact may be transmitted as it is to the safety vent 340 through the gasket 340 to rupture the safety vent 340. As a result, the secondary battery may have a problem in quality.

That is, the safety vent 340 is not ruptured by the gas pressure within the can 200, but is ruptured by the external impact to cause the problem in quality of the secondary battery.

To solve the problem, in the cap assembly 300 of the secondary battery according to the present invention, the external impact may be prevented from being transmitted to the safety vent 330 through the gasket 340 to prevent the safety vent 330 from being ruptured by the external impact.

Figure 2:
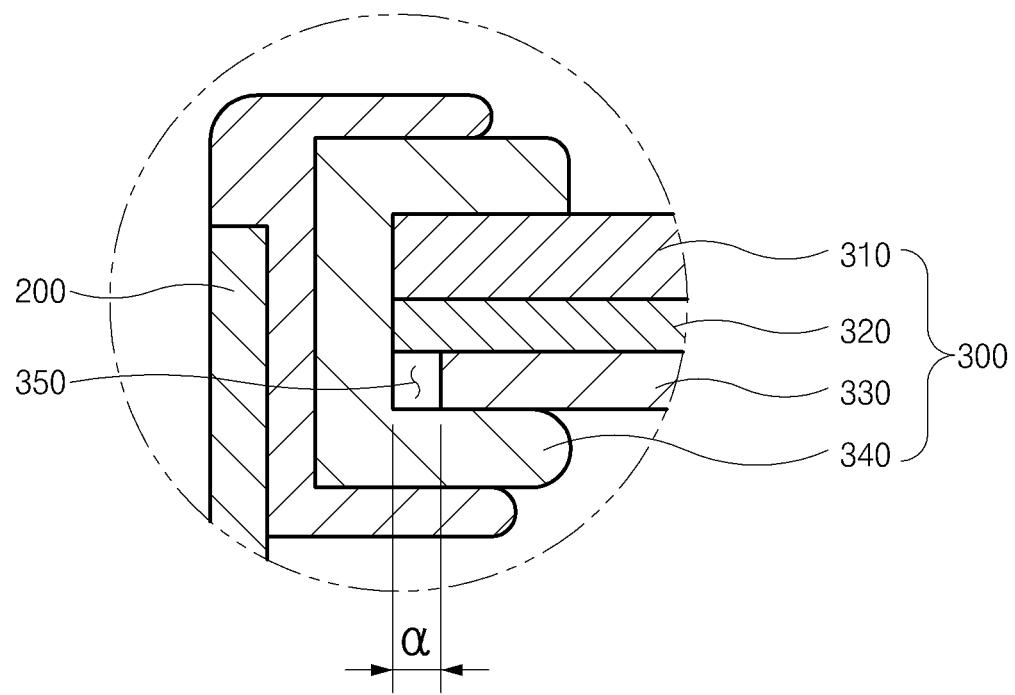
FIG. 2 is an enlarged side view of a cap assembly according to the present invention.

For example, as illustrated in FIGS. 1 and 2, in the cap assembly 300 according to the present invention, an impact absorption part 350 for absorbing an impact transferred from the gasket 340 may be disposed between an inner wall of the gasket 340 and an outer circumferential surface of the safety vent 330. The impact absorption part 350 may be an impact absorption space defined between the inner wall of the gasket 340 and the outer circumferential surface of the safety vent 330.

That is, the impact absorption space may be provided as an empty space between the gasket 340 and the safety vent 330 to absorb the external impact so that the external impact is not transmitted to the safety vent 330 through the gasket 340, thereby preventing the safety vent 330 from being ruptured by the external impact.

Figure 3:
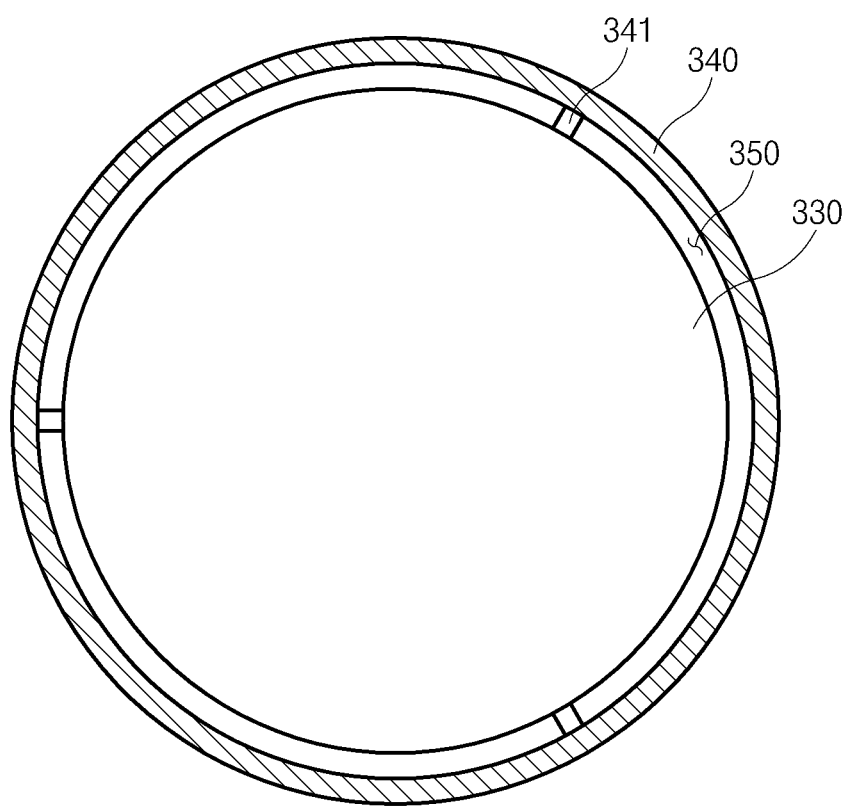
FIG. 3 is a plan view of the cap assembly according to the present invention.

Here, as illustrated in FIG. 3, the impact absorption space that is the impact absorption part 350 may be provided as the safety vent 330 has a diameter less than an inner diameter of the gasket 340. Thus, the impact absorption space may be defined without additionally providing a separate component.

A gap α between the inner wall of the gasket 340 and the outer circumferential surface of the safety vent 330 may be about 0.01 mm to about 0.30 mm. That is, when the gap α is less than about 0.01 mm, the impact may be transmitted to the safety vent 330 due to pushing and compression of the gasket 340. When the gap α is greater than about 0.30 mm, the safety vent 330 may be largely shaken within the gasket 340 by the external impact to cause short-circuit of the connected first electrode tab.

Although not described in the present invention, a groove may be defined along an inner circumferential surface of an inner diameter of the gasket 340 corresponding to an outer diameter of the safety vent 300, and the impact absorption part may be provided between the gasket 340 and the safety vent 330 through a space defined by the groove.

There is a problem in fixing the safety vent 330 at a reference position because the safety vent 330 has the outer diameter less than the inner diameter of the gasket 340. For this, a support part 341 for fixing the safety vent 330 at the reference position may be provided.

Figure 4:
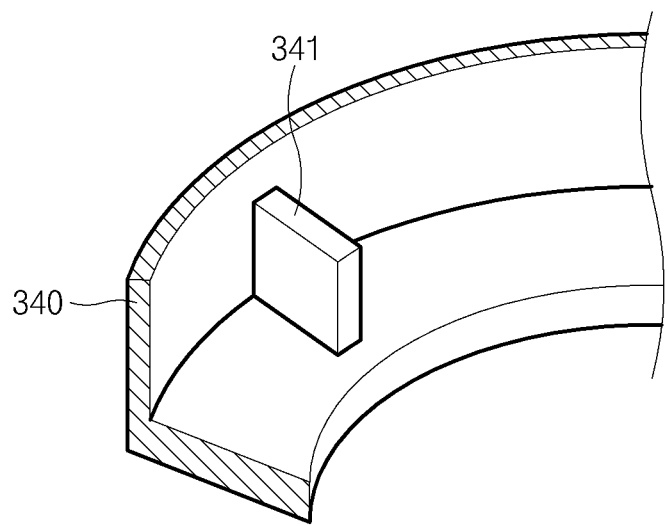
FIG. 4 is a perspective view illustrating a support part of the cap assembly according to the present invention.

That is, as illustrated in FIG. 4, the support part 341 may be disposed on the inner diameter of the gasket 340 to protrude to the safety vent 330. Thus, since the outer circumferential surface of the safety vent 330 is supported by the support part 341, the safety vent 330 may be fixed at the reference position of the cap assembly without separate adjustment.

Here, at least three or more support parts 341, preferably, three support parts 341 may be disposed on the inner diameter of the gasket 340 at the same interval. Thus, the safety vent 330 may be fixed at the reference position, and the impact absorption part 350 may be maximally secured between the gasket 340 and the safety vent 330.

The support part 341 may be integrated with the gasket 340. That is, when the gasket 340 is manufactured, the gasket 340 may be molded together with the support part 341 to improve easy of manufacture.

The support part 341 may be provided as a vertical plate that is vertically perpendicular to the inner wall of the gasket 340 when viewed in FIG. 4. Thus, the support part 341 may be improved in strength, and the contact surface between the support part 341 and the safety vent 330 may be minimized to minimize the impact transmitted from the gasket 340 to the safety vent 330.

Here, the support part 341 may be removed from the gasket 340 after the safety vent 330 is fixed at the reference position. Thus, the contact surface between the inner diameter of the gasket 340 and the outer circumferential surface of the safety vent 330 may be completely removed.

Figure 5:
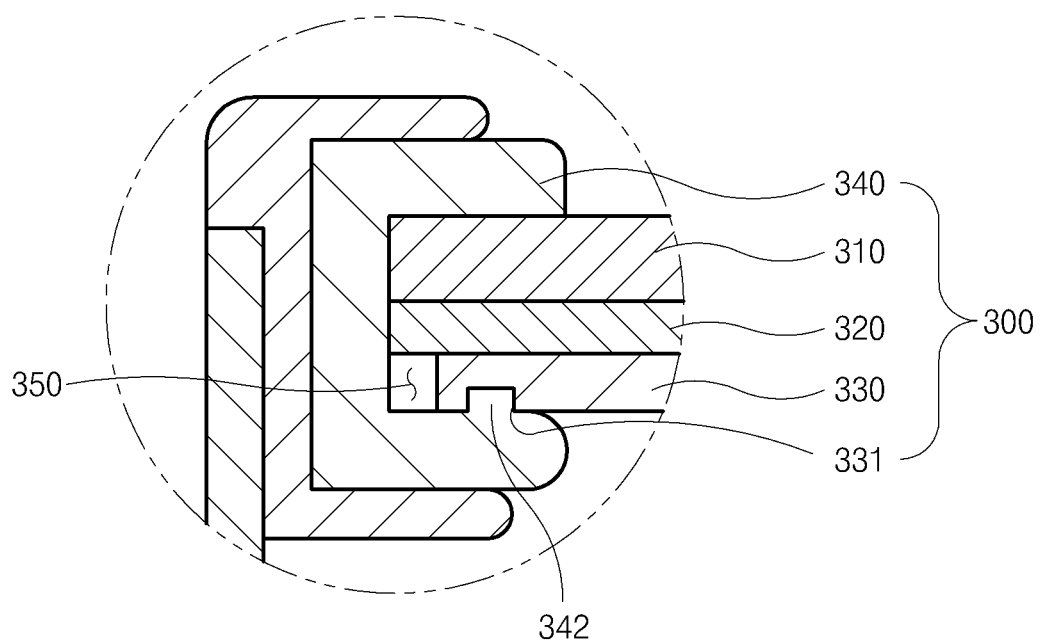
FIG. 5 is a cross-sectional view illustrating a coupling protrusion and a coupling groove of the cap assembly according to the present invention.

As illustrated in FIG. 5, in the cap assembly 300, a coupling protrusion and a coupling groove, which are coupled to each other, may be provided on the contact surface between the safety vent 330 and the gasket 340 to improve fixing force of the safety vent 330.

For example, the coupling protrusion 342 may be provided on one contact surface of the contact surfaces of the safety vent 330 and the gasket 340, i.e., the contact surface of the gasket 340, and the coupling groove 331, which is coupled to the coupling protrusion 342, may be provided in the other contact surface, i.e., the contact surface of the safety vent 330 to improve the fixing force of the safety vent 330 against the external impact.

Figure 6:
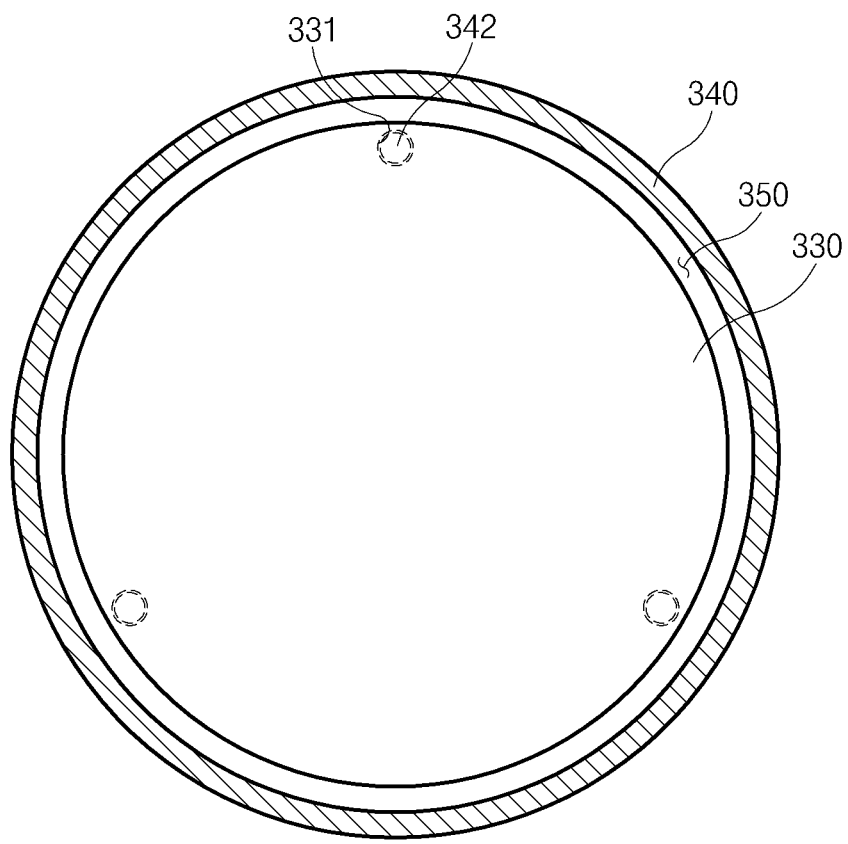
FIG. 6 is a plan view of FIG. 5.

As illustrated in FIG. 6, at least three or more coupling protrusions 342 and at least three coupling grooves 331, which are coupled to each other, may be provided at the same interval along the contact surface between the safety vent 330 and the gasket 340. As a result, the safety vent 330 may be fixed at the reference position without using the above-described support part 341, and thus, the support part 341 may be omitted.

In the cap assembly 300 of the secondary battery according to the present invention, the impact absorption part 350 may be provided to absorb the impact transferred from the gasket 340 and thereby to prevent the impact from being transmitted to the safety vent 340 even though the gasket 340 is shaken or compressed by the external impact. Thus, it may prevent the safety vent 340 from being ruptured by the external impact, to prevent defects from occurring, and to improve the quality.

Hereinafter, in description of an electrode assembly according to another embodiment of the present invention, components having the same constituent and function as those of the foregoing embodiment have been given the same reference numeral in the drawings, and thus duplicated description will be omitted.

Figure 7:
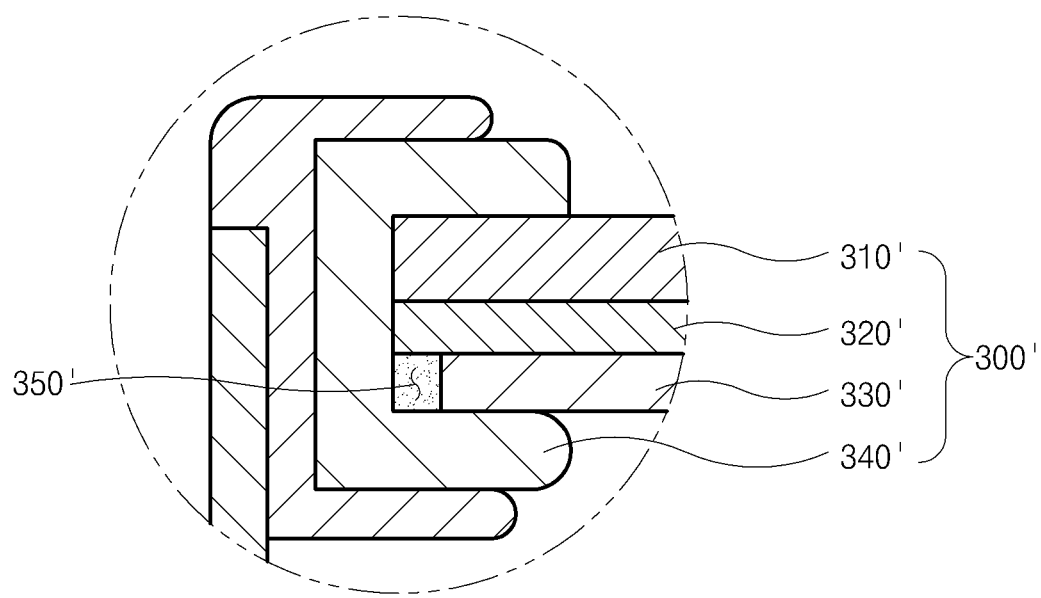
FIG. 7 is an enlarged side view of a cap assembly according to another embodiment of the present invention.
Figure 8:
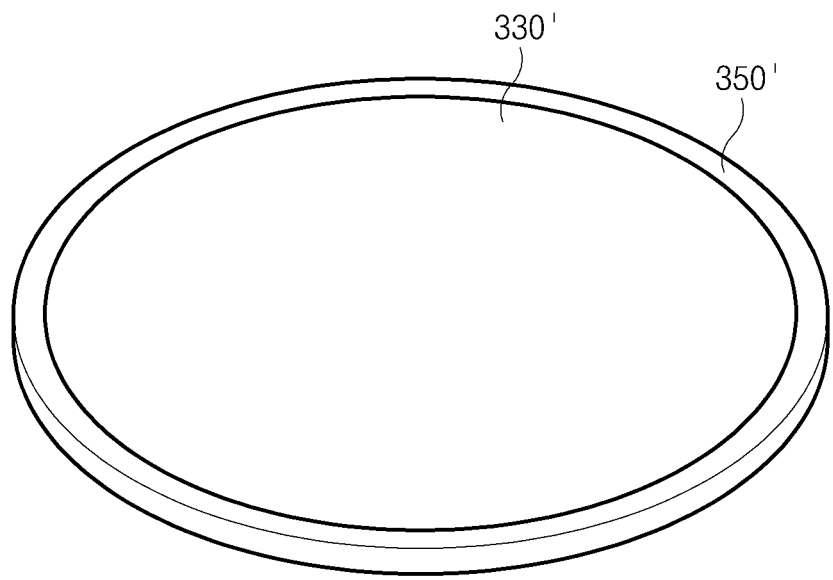
FIG. 8 is a perspective view illustrating an impact absorption member of the cap assembly according to the present invention.
Figure 9:
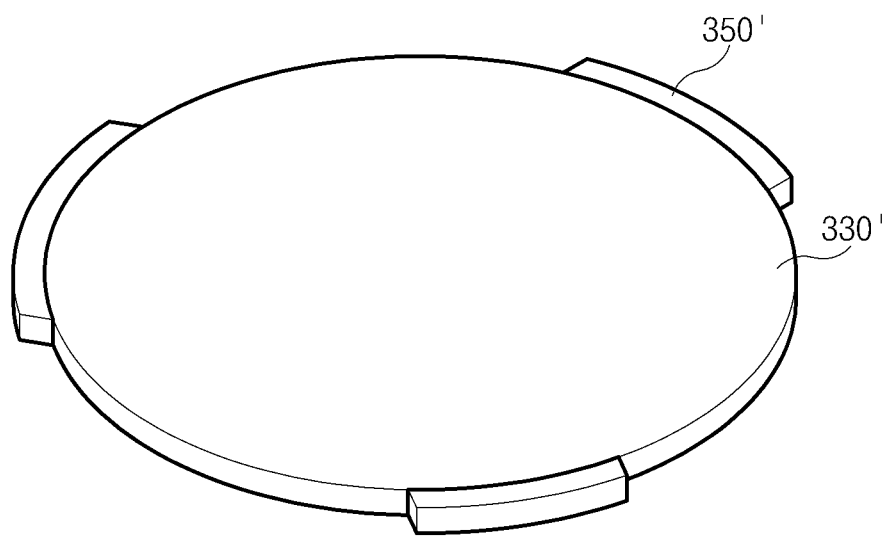
FIG. 9 is a perspective view of an impact absorption part according to another embodiment of the present invention.

FIGS. 7 to 9 are views of an impact absorption part of a cap assembly according to another embodiment of the present invention.

As illustrated in FIG. 7, a cap assembly 300' according to the present invention comprises a top cap 310', a safety element 320' disposed on a lower portion of the top cap 310', a safety vent 330' disposed on a lower portion of the safety element 320', and a gasket 340' surrounding edges of the top cap 310', the safety element 320', and the safety vent 330' and mounted on an opening of the can 200'.

Here, an impact absorption part 350' may be disposed between the gasket 340' and the safety vent 330'. The impact absorption part 350' may be provided as an impact absorption member made of a material having elasticity.

As described above, when the impact absorption part is provided as an impact absorption space, the separate support part for fixing the safety vent at a reference position may be required, and the safety vent may be finely shaken by the impact.

However, the impact absorption part 350' made of the material having the elasticity according to this embodiment may absorb the external impact and prevent the safety vent 330' from being shaken.

That is, as illustrated in FIG. 8, the impact absorption member that is the impact absorption part 350' may be disposed between an inner diameter of the gasket 340' and an outer circumferential surface of the safety vent 330' and attached to the outer circumferential surface of the safety vent 330' or the inner diameter of the gasket 340'. Here, the impact absorption member may be more easily attached to the outer circumferential surface of the safety vent 330' in comparison with the inner diameter of the gasket 340'.

As described above, the impact absorption member may be easily fixed at the reference position of the safety vent 330' and absorb and block the impact transmitted from the gasket 340' to the safety vent 330'.

As illustrated in FIG. 9, at least three or more impact absorption members, preferably, three impact absorption members may be provided at the same interval on the outer circumferential surface of the safety vent 330'. Thus, the impact absorption members may absorb the impact transmitted from the gasket 340' and also easily fix the safety vent 330' at the reference position.

Thus, in the cap assembly 300' according to this embodiment, the impact absorption member may be provided between the gasket 340' and the safety vent 330' to prevent the safety vent 330' from being ruptured by the external impact and also to easily fix the safety vent 330' at the reference position.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A cap assembly for a secondary battery, which is mounted on an opening of a can, the cap assembly comprising:
   a top cap;
   a safety element disposed on a lower portion of the top cap;
   a safety vent disposed on a lower portion of the safety element;

a gasket surrounding edges of the top cap, the safety element, and the safety vent and mounted on the opening of the can; and a plurality of support parts spaced apart around the safety vent and disposed between an inner wall of the gasket and an outer circumferential surface of the safety vent to align a reference position of the safety vent, wherein an impact absorption part absorbing an impact from the gasket is disposed between the inner wall of the gasket and the outer circumferential surface of the safety vent.

2. The cap assembly of claim 1, wherein the impact absorption part is an impact absorption space defined between the inner wall of the gasket and the outer circumferential surface of the safety vent.

3. The cap assembly of claim 2, wherein the safety vent has a diameter less than an inner diameter of the gasket so that the impact absorption space is defined.

4. The cap assembly of claim 2, wherein the plurality of support parts are disposed in the impact absorption space.

5. The cap assembly of claim 4, wherein at least three or more support parts are disposed at the same interval on the inner wall of the gasket.

6. The cap assembly of claim 4, wherein the support parts are integrated with the gasket.

7. The cap assembly of claim 4, wherein the support plate is provided as a vertical plate on the inner wall of the gasket.

8. A cap assembly for a secondary battery, which is mounted on an opening of a can, the cap assembly comprising:

a top cap;

a safety element disposed on a lower portion of the top cap;

a safety vent disposed on a lower portion of the safety element;

a gasket surrounding edges of the top cap, the safety element, and the safety vent and mounted on the opening of the can; and an impact absorption part disposed between an inner wall of the gasket and an outer circumferential surface of the safety vent, wherein the impact absorption part is provided as at least three or more impact absorption members discrete from the gasket and spaced apart around the outer circumferential surface of the safety vent, the impact absorption members made of a material having elasticity so as to absorb an impact from the gasket.

9. The cap assembly of claim 8, wherein the impact absorption members are attached to the outer circumferential surface of the safety vent.

10. The cap assembly of claim 9, wherein the impact absorption members are attached at the same interval to the outer circumferential surface of the safety vent.

11. The cap assembly of claim 8, wherein a coupling protrusion is disposed on one contact surface of contact surfaces of the safety vent and the gasket, and a coupling groove, which is coupled to the coupling protrusion, is defined in the other contact surface.

12. The cap assembly of claim 11, wherein the coupling protrusion is disposed on the contact surface of the gasket, and the coupling groove is defined in the contact surface of the safety vent.

13. The cap assembly of claim 11, wherein at least three or more coupling protrusions and at least three or more coupling grooves, which are coupled to each other, are provided at the same interval along the contact surfaces of the safety vent and the gasket.

14. A cap assembly for a secondary battery, which is mounted on an opening of a can, the cap assembly comprising:

a top cap;

a safety element disposed on a lower portion of the top cap;

a safety vent disposed on a lower portion of the safety element; and a gasket surrounding edges of the top cap, the safety element, and the safety vent and mounted on the opening of the can, wherein an impact absorption part absorbing an impact from the gasket is disposed between an inner wall of the gasket and an outer circumferential surface of the safety vent, wherein the safety vent and the gasket each have a respective contact surface in contact with one another, and wherein a coupling protrusion is disposed on the contact surface of the gasket and a coupling groove is defined in the contact surface of the safety vent, the coupling protrusion being received within the coupling groove.

15. The cap assembly of claim 14, wherein at least three or more coupling protrusions and at least three or more coupling grooves, which are coupled to each other, are provided at the same interval along the contact surfaces of the safety vent and the gasket.

16. The cap assembly of claim 14, wherein the impact absorption part is an impact absorption space defined between the inner wall of the gasket and the outer circumferential surface of the safety vent.

17. The cap assembly of claim 14, wherein the impact absorption part is provided as an impact absorption member discrete from the gasket, the impact absorption member made of a material having elasticity so as to absorb an impact from the gasket.

18. The cap assembly of claim 17, wherein the impact absorption member is attached to the outer circumferential surface of the safety vent.

19. The cap assembly of claim 18, wherein at least three or more impact absorption members are attached at the same interval to the outer circumferential surface of the safety vent.

* * * * *